United States Patent Office 2,773,899
Patented Dec. 11, 1956

2,773,899

ALKENOIC AMIDES OF ARYLETHERS OF ALKANOLAMINES

Henry Martin, Zurich, and Hans Zutter, Schaffhouse, Switzerland, assignors to Cilag Limited, Schaffhouse, Switzerland, a corporation of Switzerland No Drawing. Application November 23, 1954, Serial No. 470,804

Claims priority, application Germany November 24, 1953

7 Claims. (Cl. 260—562)

This invention relates to novel amides, their production and use.

The invention provides novel amides of the general formula

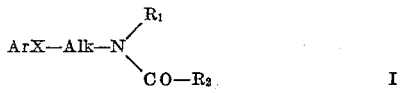
$$\text{ArX—Alk—N} \begin{matrix} R_1 \\ \diagdown \\ CO—R_2 \end{matrix} \quad \text{I}$$

in which Ar is an aryl radical, which may be substituted, X is oxygen or sulphur, Alk is a lower alkylene radical, $R_1$ is hydrogen or an alkyl, alkenyl or aralkyl radical, and $R_2$ is an $\alpha,\beta$-unsaturated aliphatic radical.

The new amides have valuable pharmaceutical properties. For example, they inhibit the growth of pathogenic bacteria and of fungi, and they also have an insecticidal and acaricidal action. Moreover, even in very great dilutions, they produce strong and durable anaesthesia on the skin.

The novel compounds are usually not water-soluble, but they do, however, dissolve very well in oils and fats. Moreover, they may be transformed into water-soluble surface anaesthetics and local anaesthetics by adding primary or secondary amines to the double bond of the radical $R_2$. Accordingly, apart from their use for pharmaceutical purposes, the said novel amides represent valuable intermediate products for the production of usable water-soluble local anaesthetics.

The new amides may be prepared by the following processes.

By reacting an amine of the formula

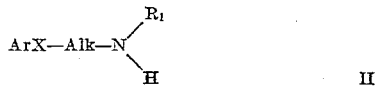
$$\text{ArX—Alk—N} \begin{matrix} R_1 \\ \diagdown \\ H \end{matrix} \quad \text{II}$$

or an amine salt, an N-metal compound or another reactive derivative, such as for example, a carbamyl halide, by the methods known for the acylation of amines, with an acid of the formula $$R_2\text{—COOH} \quad \text{IV}$$

or a reactive functional derivative of such an acid, for example, a halide, an anhydride, a mixed anhydride, an azide, an ester or a salt.

Instead of the acid radical $R_2$—CO—, it is also possible to introduce a radical of an acid which contains, in place of the double bond, atoms or groups which can be eliminated with formation of an $\alpha,\beta$-double bond by the methods which are usual for the production of $\alpha,\beta$-unsaturated acids. For example, a radical of a keto-carboxylic acid, a halogen-carboxylic acid or a similarly substituted acid (alkyl- or aryl-sulfonyl-hydroxycarboxylic acid) or a dihalogen-carboxylic acid may be introduced by the methods mentioned above into an amide of the Formula II. In the first case, the keto group may be reduced to the hydroxy group and the latter split off in the form of water with the aid of dehydrating agents, such as, for example, sulfuric acid, phosphoric acid or toluene sulfonic acid. One halogen atom in $R_2$ may be split off in the form of hydrogen halide by means of alkalis or tertiary bases.

Instead of the acid radical $R_2CO$—, it is also possible to introduce a radical which contains in $R_2$ a residue adapted to be replaced by hydrogen. For example, alkylidene malonic acid ester halides may be reacted with the bases of Formula II and the carbalkoxy group in the amide so obtained may be converted by saponification into the carboxyl group and this latter may be split off simultaneously with the saponification, or in certain circumstances in a second step.

In another possible method of preparing the new amides, reactive esters of acylated amino-alcohols of the formula

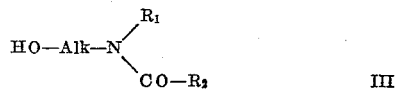
$$\text{HO—Alk—N} \begin{matrix} R_1 \\ \diagdown \\ CO—R_2 \end{matrix} \quad \text{III}$$

are reacted with phenols or thiophenols of the formula ArO(S)H, or salts thereof, or reactive esters of alcohols of the formula

$$\text{ArX Alk OH}$$

are caused to react with amides of the formula

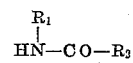
$$\begin{matrix} R_1 \\ | \\ HN\text{—CO—}R_2 \end{matrix}$$

or N-metal salts thereof, or reactive esters of alcohols of the formula

$$R_1OH$$

are reacted with amides of the formula

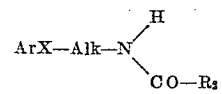
$$\text{ArX—Alk—N} \begin{matrix} H \\ \diagdown \\ CO—R_2 \end{matrix}$$

or metal salts thereof.

The following examples illustrate the production of the new amides. The parts by weight indicated in the examples are related to the parts by volume in the same way as kilograms to litres.

*Example 1*

16.8 parts by weight of 1-(p-nitro-phenoxy)-2-N-ethyl-amino-ethane and 8.1 parts by weight of triethylamine in 100 parts by volume of absolute dioxane are mixed dropwise, while stirring and cooling, with 9.5 parts by weight of dimethyl acrylic acid chloride in 50 parts by volume of absolute dioxane. The mixture is thereafter stirred for a further 2 hours at room temperature and then the precipitated triethylamine hydrochloride is filtered off with suction. After evaporating the solvent, the residue is distilled twice under high vacuum. $\beta,\beta$-dimethyl acrylic acid - N-ethyl-N-$\beta$-(4'-nitrophenoxyethyl) - amide, boiling at 200–203° C. at a pressure of 0.02 mm. is obtained with a yield of 74%. The novel amide dissolves very readily in organic solvents, except in petroleum ether, and is insoluble in water.

*Analysis.*—Calculated: C 61.63% H 6.90% N 9.58%. Found: C 61.65% H 7.14% N 9.32%.

The same compound is also obtained when the sodium salt of dimethyl acrylic acid-N-ethyl amide is reacted with $\beta$-(4-nitrophenoxyethyl)-bromide in toluene.

*Example 2*

14 parts by weight of (1-p-methoxyphenoxy)-2-N-ethylaminopropane and 6.8 parts by weight of triethylamine dissolved in 150 parts by volume of absolute ether are mixed dropwise, while stirring and cooling, with a solution of 7.9 parts by weight of dimethyl acrylic acid chloride in 30 parts by volume of absolute ether.

The mixture is thereafter stirred for a further 1½–2 hours at room temperature.

The triethylamine hydrochloride formed is extracted with water. The ether solution is successively extracted by shaking with 2N hydrochloric acid, sodium bicarbonate solution and with water. After drying over potash and evaporating the ether, the residue is distilled twice under high vacuum, whereupon β,β-dimethyl acrylic acid-N-ethyl-N-β-(4-methoxyphenoxypropyl)-amide boiling at 152–154° C. at a pressure of 0.01 mm. is obtained with a yield of 70%. The new compound can also be obtained by reacting the sodium salt of dimethyl acrylic acid-N-β-(4-methoxyphenoxypropyl)-amide with ethyl bromide.

*Example 3*

16 parts by weight of 1-(2',4',6'-trimethylphenoxy)-2-aminopropane and 8.4 parts by weight of triethylamine in 150 parts by volume of absolute ether are mixed dropwise, while stirring and cooling, with a solution of 9.8 parts by weight of dimethyl acrylic acid chloride in 30 parts by volume of absolute ether. The mixture is thereafter stirred for a further 1½–2 hours.

The reaction mixture is successively shaken with water, with 2N-hydrochloric acid, with dilute sodium bicarbonate solution and with water. It is then dried over potash and the ether distilled off. The residue immediately becomes crystalline. After recrystallising twice from petroleum ether (B. P. 60–90° C.), the compound melts at 111–112° C. The yield of pure β,β-dimethyl-acrylic acid amide of 1-(2',4',6'-trimethylphenoxymethyl)-amine is 58%.

*Analysis.*—Calculated: C, 74.14%; H, 9.15%; N, 5.09%. Found: C, 74.15%; H, 9.13%; N, 5.33%.

*Example 4*

20.7 parts by weight of 1-(2',4',6'-trimethylphenoxy)-2-N-ethyl-amino-propane and 10.1 parts by weight of triethylamine, dissolved in 150 parts by volume of absolute ether, are mixed dropwise, while stirring and cooling, with a solution of 10.5 parts by weight of crotonic acid chloride in 30 parts by volume of ether. The mixture is thereafter stirred for a further 1½-2 hours at room temperature. The reaction mixture is then shaken in succession with water, 2N hydrochloric acid, dilute sodium bicarbonate solution and then with water. After drying the ether solution over potash and evaporating the ether, the residue is distilled twice under high vacuum, whereupon there is obtained a yield of 71% of crotonic acid-N-ethyl-N-β-(2,4,6-trimethylphenoxypropyl)- amide, which boils at 146–148° C. under a pressure of 0.01 mm. The oil dissolves very well in organic solvents, but not in water.

*Analysis.*—Calculated: C, 74.14%; H, 9.15%; N, 5.09%. Found: C, 74.18%; H, 8.83%; N, 5.30%.

*Example 5*

16 gm. of dimethylacrylic acid chloride in 50 cc. of ether are added dropwise with cooling over a period of half an hour, while stirring, to a solution of 24.4 parts by weight of p-chlorophenylmercaptoethyl amine and 13.6 parts by weight of triethylamine, in 200 parts by volume of absolute ether. A crystalline deposit is immediately precipitated, which is filtered off with suction after having been stirred for a further two hours at room temperature. The filtrate is evaporated. For the purpose of removing the triethylamine hydrochloride, the residue is shaken with water and then with sodium bicarbonate and the crystal magma which is obtained is recrystallised from 75% ethanol. There is obtained a yield of 63% of β,β-dimethyl-acrylic acid amide of p-chlorophenylmercaptoethyl amine, which melts at 81–82° C.

*Analysis.*—Calculated: N, 5.19%; Cl, 13.15%; S, 11.89%. Found: N, 4.98%; Cl, 13.26%; S, 11.93%.

*Example 6*

15.1 parts by weight of 1-phenoxy-2-N-methylaminoethane and 10.1 parts by weight of triethylamine in 100 parts by volume of ether are mixed dropwise, while stirring and cooling, with a solution of 11.85 parts by weight of dimethyl-acrylic acid chloride in 50 parts by volume of ether. The reaction mixture is stirred overnight at room temperature. The precipitated triethylamine hydrochloride is filtered off with suction and the residue from the evaporated filtrate is distilled twice under high vacuum, giving an 82% yield of β,β-dimethyl-acrylic acid-N-methyl-N-β-phenoxyethyl amide, boiling at 131–132° C. under a pressure of 0.015 mm.

*Analysis.*—Calculated: C, 72.07%; H, 8.21%; N, 6.00%. Found: C, 71.80%; H, 7.95%; N, 5.92%.

This compound is also obtained when β,β-dimethyl-acrylic acid-N-methyl-N-β'-chloroethyl amide is reacted with sodium phenate in dioxane.

*Example 7*

The substance described in Example 6 is also obtained when 10 parts by weight of N-(β-phenoxyethyl)-N-methyl-carbamic acid chloride are heated for a few hours with the calculated amount of the sodium salt of dimethyl-acrylic acid in absolute dioxane until it is no longer possible to detect evolution of $CO_2$. After filtering off the sodium chloride with suction and evaporating the dioxane, the residue is distilled twice under high vacuum, whereupon the novel amide is obtained with a satisfactory yield.

The same compound is also obtained when isopropylidene-malonic acid ethyl ester chloride is reacted with β-phenoxyethyl-N-methylamine in the presence of an agent which splits off hydrogen halide, the malonic ester amide which is obtained is saponified with dilute sodium carbonate solution and the obtained isopropylidene-malonic acid-mono-N-β-phenoxyethyl-N-methylamide is heated until the evolution of $CO_2$ ceases.

*Example 8*

By reaction of 35.8 parts by weight of 1-phenoxy-2-N-ethyl-amino-propane with 20.9 parts by weight of crotonic acid chloride in the presence of 20.2 parts by weight of triethylamine in ether, crotonic acid-N-ethyl-N-β-phenoxy-propyl-amide is obtained, which boils at 138–139° C. under a pressure of 0.01 mm. This compound is also obtained by heating α-chlorobutyric acid-N-ethyl-N-β-phenoxypropyl-amide with quinoline.

*Example 9*

By reacting 20 parts by weight of 1-phenoxy-2-N-ethyl-amino-ethane with 14.3 parts by weight of dimethyl-acrylic acid chloride in ether in the presence of 12.2 parts by weight of triethylamine, β,β-dimethyl-acrylic acid-N-ethyl-N-β-phenoxyethyl-amide is obtained with a yield of 86%, this substance boiling at 134–135° C. at a pressure of 0.01 mm.

*Example 10*

20 parts by weight of 1-phenoxy-2-N-ethylamino-ethane are reacted in ether with 12 parts by weight of crotonic acid chloride in the presence of 12.4 parts by weight of triethylamine. In this way, there is obtained a yield of 86.9% of crotonic acid-N-ethyl-N-β-phenoxyethyl-amide, which boils at 133–134° C. under a pressure of 0.01 mm. The same compound is also obtained when acetoacetic acid-N-ethyl-N-β-phenoxyethyl-amide is reduced to the corresponding β-hydroxy-butyric acid amide and water is split off from the latter with the aid of toluene sulfonic acid.

*Example 11*

25.8 parts by weight of 1-(2'-methylphenoxy)-2-N-methyl-amino-propane are reacted in ether in the presence of 14.5 parts by weight of triethylamine with 15.1 parts by weight of crotonic acid chloride. A yield of 78.2% of crotonic acid-N-methyl - N - β - (2' - methylphenoxy-propyl)-amide is obtained, this compound boiling at 153–154° C. under a pressure of 0.07 mm.

*Example 12*

21 parts by weight of 1-(2',4'-dimethyl-phenoxy)-2-methylamino-propane are reacted in ether in the presence of 11.0 parts by weight of triethylamine with 11.4 parts by weight of crotonic acid chloride. By this method, there are obtained 62.3% of the crotonic acid-N-methyl-N-β-(2,4-dimethylphenoxypropyl)-amide, which boils at 136–138° C. under a pressure of 0.02 mm.

Other amides of the general formula

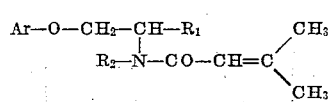

which can be produced by the above described processes are set out in the following table:

TABLE I

| Ar | $R_1$ | $R_2$ | $R_3$ | Mm. Hg | B.P. (M.P.), °C. |
|---|---|---|---|---|---|
| ⌬ | H | —CH₃ | H | 0.015 | 131–132 |
| ⌬ | H | —C₃H₇(n) | H | 0.05 | 142–143 |
| ⌬ | H | —C₃H₇(n) | CH₃ | 0.07 | 153–154 |
| ⌬ | H | —C₃H₇(i) | H | 0.06 | 135–136 |
| ⌬ | H | —C₃H₇(i) | CH₃ | 0.03 | 141–143 |
| ⌬ | H | —C₄H₉(n) | H | 0.03 | 140–141 |
| ⌬ | H | —C₄H₉(n) | CH₃ | 0.07 | 155–156 |
| ⌬ | H | —CH₂—⌬ | H | 0.03 | 190–191 |
| ⌬ | H | —CH₂—⌬ | CH₃ | 0.03 | 193–194 |
| ⌬ | CH₃ | —C₃H₇(n) | H | 0.04 | 147–148 |
| ⌬ | CH₃ | —C₃H₇(n) | CH₃ | 0.05 | 152–153 |
| ⌬ | CH₃ | —C₃H₇(i) | H | 0.03 | 141–142 |
| ⌬ | CH₃ | —C₃H₇(i) | CH₃ | 0.05 | 144–145 |
| ⌬ | CH₃ | —C₄H₉(n) | H | 0.04 | 151–152 |
| ⌬ | CH₃ | —C₄H₉(n) | CH₃ | 0.07 | 156–157 |
| ⌬ | CH₃ | -CH₂-⌬ | H | 0.04 | 195–196 |
| ⌬ | CH₃ | -CH₂-⌬ | CH₃ | 0.05 | 198–199 |
| ⌬ | CH₃ | H | H | ------ | (99–100) |

TABLE I—Continued

| Ar | $R_1$ | $R_2$ | $R_3$ | Mm. Hg | B.P. (M.P.), °C. |
|---|---|---|---|---|---|
| ⌬ | CH₃ | H | CH₃ | ------ | (71–71.5) |
| ⌬ | CH₃ | CH₃ | H | 0.03 | 140–141 |
| ⌬ | CH₃ | CH₃ | CH₃ | 0.02 | 140–141 |
| ⌬ | CH₃ | C₂H₅ | H | 0.01 | 138–139 |
| ⌬ | CH₃ | C₂H₅ | CH₃ | 0.03 | 146–148 |
| CH₃-⌬-(CH₃)(CH₃) | H | CH₃ | H | 0.02 | 145–146 |
| | H | CH₃ | CH₃ | 0.02 | 148–149 |
| | H | C₂H₅ | H | 0.02 | 147–148 |
| | H | C₂H₅ | CH₃ | 0.015 | 151–152 |
| ⌬-CH₃ | CH₃ | CH₃ | CH₃ | 0.03 | 147 |
| | CH₃ | C₂H₅ | H | 0.015 | 137–138 |
| | CH₃ | C₂H₅ | CH₃ | 0.015 | 140–141 |
| CH₃-⌬-CH₃ | CH₃ | CH₃ | H | 0.02 | 141–143 |
| | CH₃ | CH₃ | CH₃ | 0.02 | 145–148 |
| CH₃-⌬-(CH₃) | CH₃ | CH₃ | CH₃ | 0.02 | 142–143 |
| | CH₃ | C₂H₅ | H | 0.02 | 146–148 |
| | CH₃ | C₂H₅ | CH₃ | 0.02 | 140–141 |
| CH₃-⌬-(CH₃)(CH₃) | CH₃ | CH₃ | H | 0.02 | 148–149 |
| | CH₃ | CH₃ | CH₃ | 0.02 | 149–150 |
| | CH₃ | C₂H₅ | H | 0.02 | 151–152 |
| | CH₃ | C₂H₅ | CH₃ | 0.02 | 153–154 |
| CH₃-⌬-(CH₃)(CH₃)(CH₃) | CH₃ | H | H | ------ | (106–107.5) |
| | CH₃ | H | CH₃ | ------ | (111–112) |
| | CH₃ | CH₃ | H | 0.02 | 152–153 |
| | CH₃ | CH₃ | CH₃ | 0.02 | 160–161 |
| | CH₃ | C₂H₅ | CH₃ | 0.01 | 152–153 |
| CH₃O-⌬ | CH₃ | CH₃ | H | 0.02 | 153–154 |
| | CH₃ | CH₃ | CH₃ | 0.02 | 156–161 |
| | CH₃ | C₂H₅ | H | 0.015 | 154–156 |
| Cl-⌬ | CH₃ | CH₃ | H | 0.015 | 157–158 |
| | CH₃ | CH₃ | CH₃ | 0.02 | 152–153 |
| | CH₃ | C₂H₅ | H | 0.03 | 161–162 |
| | CH₃ | C₂H₅ | CH₃ | 0.02 | 152–154 |
| ⌬-Cl | CH₃ | CH₃ | H | 0.02 | 159–160 |
| | CH₃ | CH₃ | CH₃ | 0.04 | 160–161 |
| | CH₃ | C₂H₅ | H | 0.03 | 158–159 |
| | CH₃ | C₂H₅ | CH₃ | 0.02 | 155–157 |
| NO₂-⌬ | H | CH₃ | CH₃ | 0.02 | 192–195 |

The invention further includes an acaricidal composition comprising an amide of the general formula I above in finely dispersed form and a diluent or solvent, which is not toxic to warm-blooded animals and plants.

For example the following compounds of the general formula

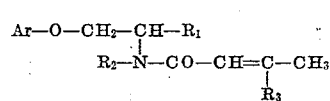

have a good acaricidal action when used in 5% solution. The significance of the signs used in the following table is as follows:

+++ =90–100% dead after 30 minutes.
++ =70–90% dead after 30 minutes.

TABLE II

| Ar | $R_1$ | $R_2$ | $R_3$ | Acaricidal action |
|---|---|---|---|---|
| phenyl | H | $C_2H_5$ | H | +++ |
| phenyl | H | $C_2H_5$ | $CH_3$ | +++ |
| phenyl | H | $C_3H_7(n)$ | $CH_3$ | ++ |
| phenyl | H | $C_3H_7(i)$ | H | ++ |
| phenyl | H | $C_4H_9(n)$ | H | ++ |
| phenyl | H | $C_4H_9(n)$ | $CH_3$ | ++ |
| phenyl | $CH_3$ | H | $CH_3$ | +++ |
| phenyl | $CH_3$ | $CH_3$ | H | +++ |
| phenyl | $CH_3$ | $CH_3$ | $CH_3$ | ++ |
| phenyl | $CH_3$ | $C_2H_5$ | H | +++ |
| phenyl | $CH_3$ | $C_3H_7(n)$ | H | ++ |
| phenyl | $CH_3$ | $C_3H_7(n)$ | $CH_3$ | ++ |
| phenyl | $CH_3$ | $C_3H_7(i)$ | H | ++ |
| phenyl | $CH_3$ | $C_3H_7(i)$ | $CH_3$ | ++ |
| phenyl | $CH_3$ | $C_4H_9(n)$ | $CH_3$ | +++ |
| phenyl | $CH_3$ | $CH_3$ | H | +++ |
| 3-CH₃-phenyl | $CH_3$ | $CH_3$ | $CH_3$ | ++ |
| 4-CH₃-phenyl | $CH_3$ | $CH_3$ | H | +++ |
| 4-CH₃-phenyl | $CH_3$ | $C_2H_5$ | H | +++ |
| 3,4-(CH₃)₂-phenyl | H | $C_2H_5$ | $CH_3$ | +++ |
| 3,4-(CH₃)₂-phenyl | $CH_3$ | H | H | ++ |
| 3,4,5-(CH₃)₃-phenyl | $CH_3$ | H | $CH_3$ | +++ |
| 3,4,5-(CH₃)₃-phenyl | $CH_3$ | $C_2H_5$ | H | ++ |
| 3,4,5-(CH₃)₃-phenyl | $CH_3$ | $C_2H_5$ | $CH_3$ | +++ |

Since these compounds are practically odourless and, when properly used, do not cause any irritation of the skin of the user, they are outstandingly suitable for the production of acaricidal preparations for plant protection, and also for veterinary and hygiene purposes.

The forms in which they are used depend entirely upon the purposes for which they are applied. The active compounds may be used in suitable solvents or diluents, in the form of emulsions or dispersions, on suitable solid or semi-solid vehicles, in ordinary or synthetic soaps, detergents, dispersing agents and also together with other compounds having an acaricidal, insecticidal, ovicidal, fungicidal and/or bactericidal action, or together with inactive additions.

As solid vehicles, which are suitable for the production of preparations in powder form, there may be considered various inert, porous and pulverulent diluents of inorganic or organic nature, such as, for example, tricalcium phosphate, calcium carbonate in the form of prepared chalk or crushed limestone, kaolin, bole, bentonite, talcum, magnesia usta, kieselguhr, boric acid; cork powder, sawdust and other finely powdered materials of vegetable origin are also suitable vehicles. The active components are mixed with these vehicles, for example, by being ground therewith; or the inert vehicle is impregnated with a solution of the active component in a readily volatile solvent. By addition of wetting and/or dispersing agents, it is also possible for such powdered preparations to be made readily wettable with water, so that stable aqueous suspensions can be made. Suitable inert solvents for the production of liquid preparations should not be readily inflammable and should as far as possible be odourless and as far as possible non-toxic to human beings and animals. As suitable solvents, there may be considered: firstly, high-boiling oils, for example of vegetable origin, and secondly also low-boiling solvents with a flash point of at least 30° C., such as isopropanol. It is obviously also possible to use mixtures of solvents. The production of solutions may be carried out in the usual manner, if necessary with the assistance of solution promotors.

Other liquid forms which can be used consist of emulsions or suspensions of the active component in water or suitable inert solvents or of concentrates for the rreparation of such emulsions, which may immediately be adjusted to the required concentration at the place of use by dilution. For this purpose, the active component is mixed, for example, with a dispersing agent or emulsifier. The active component may also be dissolved or dispersed in a suitable inert solvent and be simultaneously or subsequently mixed with a dispersing agent or emulsifier. By diluting such a concentrate, for example with water, there are obtained emulsions or suspensions which are ready for use. With suitable concentration and proportions of active component, emulsifier and water, it is possible to obtain clear, absolutely stable aqueous solutions (emulsoids).

For cosmetic purposes, there may also be considered semi-solid vehicles of a cream, ointment, paste or waxlike nature, into which the active substance may be incorporated, perhaps with the aid of solution promoters and/or emulsifiers. Such semi-solid preparations usually constitute emulsions. Petroleum jelly and other cream foundations may be referred to as examples of semi-solid vehicles.

The active component may in turn consist of one or more compounds of the indicated formula, and the compounds may also be used in combination with other acaricidal, insecticidal, ovicidal, fungicidal or bactericidal substances, combined preparations being obtained which have a wide range of action.

Furthermore, it is possible to use the active component in the form of aerosols. For this purpose, the active component is dissolved or dispersed in a solvent, such as difluorodichloromethane, which boils at below room temperature under atmospheric pressure, the said component being dissolved or dispersed if necessary with the assistance of suitable inert solvents as a carrier liquid. By this means, there are obtained solutions under pressure, which upon being sprayed supply aerosols which are particularly suitable for attacking mites in enclosed spaces, in grain silos and other storage chambers.

As further additives which may be admixed with the said forms of application, there may be mentioned: adhesive substances, such as casein, fatty acid salts, size, resins, greases, protein decomposition products; wetting agents, dissolving intermediaries, dyestuffs, odorous substances, and also anti-dusting agents in the case of preparations in powdered form.

It is readily possible, by choice of the different dispersing agents and additives, to give the preparations a composition and properties dependent thereon which make them suitable for special purposes of use.

The acaricides may be used in accordance with the usual methods of application. The acari or the material to be treated or to be protected against attack by acari, such material being, for example, plants, roots, tubers, drugs, textiles, packing materials, grain, seeds, wood, leather, skins, paper, pelts, hair, feathers, articles of all kinds, tapestries, walls, floors, may be treated with the media which have been described, whether by dusting, sprinkling, spraying, brushing, smearing, impregnating or any other suitable methods. Media which contain the defined active component are also very suitable for cleaning and washing the warm-blooded animal attacked by mites and ticks. Vehicles which are particularly suitable for this form of application are hereinafter referred to. As liquid vehicles, there may be used, for example, paraffin oil or vegetable oils, such as olive oil, castor oil, sesame oil, and also glycerine and the like. Petroleum jelly, wool grease and the like may be used, for example, as semi-solid vehicles. As emulsifiers, for example, for the production of aqueous solutions and emulsions, soaps are mainly to be considered, but also sulphonated fats, fatty acid esters and fatty alcohol sulphonates, quaternary ammonium compounds of relatively high molecular weight, and also non-ionic emulsifiers, such as condensation products from fatty alcohols with ethylene oxides. It is, however, also possible to prepare emulsions of ointment-like consistency, for example, by using stearic acid, salts of fatty acids and water.

For the preparation of non-greasy ointments, it is also possible to incorporate bases of cellulose ethers or other swelling substances of animal, vegetable or synthetic origin, and water, or also inorganic substances, such as aluminum hydroxide gel, if necessary with assistance of emulsifiers and/or solution promoters. If desired, the preparations which are obtained may also be perfumed by addition of odorous substances. Good adherent vehicles in powder form are for example talcum, starch, lactose and the like.

Different embodiments for the production of acaricides are described in the following examples. The parts indicated are always to be understood to be parts by weight.

*Example (a)*

5 parts of crotonic acid-N-ethyl-N-β-phenoxy-ethylamide (B. P. 0.01:133–134° C.) are ground with 90 parts of talcum in a ball mill; 2 parts of olein are then added, the mixture is ground again and finally mixed with 1 part of slaked lime. The powder which is formed can be dusted satisfactorily and has a very good adhesive power. It may be used for dusting rooms and articles or for plant-protection purposes. An even better dispersion is obtained if the vehicle is impregnated with a solution of the active substance, for example, in alcohol or acetone, and the solvent is thereafter evaporated.

*Example (b)*

15 parts of crotonic acid-N-ethyl-N-β-phenoxy-ethylamide are mixed with 22 parts of kaolin, 4 parts of the sodium salt of dibutyl-naphthalene-sulphonic acid, 4 parts of casein and 5 parts of sodium carbonate and ground. 100 parts of finely ground chalk are then added. The powder which is formed produces in water a sufficiently stable suspension, which may be used for spraying rooms and articles infested by mites and, for example, also for plant-protection purposes.

*Example (c)*

80 parts of β,β-dimethyl-acrylic acid-N-ethyl-N-β-phenoxy-ethylamide (B. P. 0.01:134–135° C.) are thoroughly triturated with 20 parts of talcum. This concentrate may be used directly as a dusting powder for attacking mites. It may, however, also be further diluted to any required concentration.

Such powders, which may also be produced on other bases, are suitable as dusting agents, for example, for combatting mites and ticks on the human or animal skin. Such powders are particularly suitable, for example, for attacking dermacentor, the carrier of Rocky Mountain spotted fever, and infection caused by rickettsia. Powder preparations, for example, with a base of starch flour, may however also be used for attacking mites in stores, by the agent being admixed, for example, with the grain. If necessary, additives may be provided for improving the adhering power, for which purpose, for example, an addition of 4% of a liquid fatty acid is suitable.

*Example (d)*

5 parts of crotonic acid-N-ethyl-N-β-phenoxy-ethylamide are dissolved in 95 parts of alkylated naphthalene and used as a domestic spray for the treatment of walls and floors.

*Example (e)*

By mixing 10 parts of crotonic acid-N-ethyl-N-β-phenoxy-ethyl-amide with 90 parts of olive oil, there is obtained a clear solution which may be used for attacking mites and ticks in the veterinary and hygiene sphere. It is possible to attack, for example, the ear tick (ornithodorus mengini), which mainly attacks domestic animals.

*Example (f)*

30 parts of crotonic acid-N-ethyl-N-β-phenoxy-ethylamide and 70 parts of a fatty acid ester sulphonate produce a clear solution which may be diluted with any desired amount of water. Initially, there is formed a milky emulsion which, however, changes into a stable, probably colloidal solution (emulsoid).

Turkey red oil, for example, may be used as fatty acid ester sulphonate. The ratio of active substance to emulsifier may be varied. Such solutions or emulsions may be used with advantage for a wide variety of purposes. For example, they are suitable for spraying rooms infested or endangered by mites, for example, against glyciphagus (house mite), which lives on foodstuffs, but may also attack human beings. However, a wide variety of objects which are attacked by mites or which are to be protected against such attack may be sprayed with this solution or may be impregnated by dipping in said solution. In a similar manner, these emulsions may also be used for protecting plants.

Similarly, parts of human and animal bodies which are infested with mites and ticks may be coated or smeared externally with such a solution. For the treatment of small animals, it is expedient to use such a solution as a bath liquid, for example, for attacking the wood mite (ixodes rhicinus) on dogs and cats infested therewith.

*Example (g)*

30 parts of crotonic acid-N-ethyl-N-β-phenoxy-ethyl-amide, 30 parts of xylene and 40 parts of Turkey red oil are mixed and produce a clear solution, which may be emulsified in any proportion in water. This emulsion is used as indicated in Example (f).

*Example (h)*

A homogeneous paste is obtained by stirring 30 parts of crotonic acid-N-ethyl-N-β-phenoxy-ethyl-amide with 70 parts of potash soap. By dilution with water, there is obtained an emulsion which is suitable as a washing liquid with mite-killing properties. Using this emulsion it is possible to clean and disinfect rooms infested with mites and ticks and room plants, for example, may also be treated.

*Example (i)*

By stirring 7 parts of crotonic acid-N-ethyl-N-β-phenoxy-ethyl-amide with 93 parts of spirit of soap, a clear solution is obtained. It is also possible to produce solutions of high concentration which, upon dilution with water, change into emulsions which may be used as in Example (f).

*Example (k)*

1.4 parts of dimethyl-aminoacetic acid-dodecyl-amide-chloro-benzylate and 49 parts of crotonic acid-N-ethyl-N-β-phenoxy-ethyl amide are dissolved in 49.6 parts of alcohol. This clear solution provides an emulsion when it is diluted with water. Substantially the same uses are possible with these emulsions as for the solution according to Example (f).

*Example (l)*

8 parts of paraffin, 15 parts of stearic acid, 5 parts of wool grease and 2 parts of wax are heated together to 80° C. At this temperature, 3 parts of glycerine, 1 part of triethanolamine, 58.5 parts of water (preheated to 80° C.) and 0.5 part of concentrated ammonia are mixed in while stirring. The finished ointment base is then stirred with 7 parts of crotonic acid-N-ethyl-N-β-phenoxy-ethyl-amide, whereby there is obtained a homogeneous cream with strong mite-killing action, this cream being particularly suitable for veterinary and hygiene purposes in the treatment of parts of the skin infested with mites and ticks, for example, for attacking the autumn mite on warm-blooded animals infested therewith.

*Example (m)*

3 parts of methyl cellulose are allowed to swell in 90 parts of hot water and the mass which is obtained is thoroughly mixed with 7 parts of crotonic acid-N-ethyl-N-β-phenoxy-ethyl-amide. By this means, there is obtained a non-greasy acaridical ointment. Other swellable substances, such as tragacanth, gelatine or alginates, may also be used instead of methyl cellulose. Such an ointment may be used, for example, to attack types of dermanyssus on poultry.

*Example (n)*

7 parts of crotonic acid-N-ethyl-N-β-phenoxy-ethyl-amide are stirred with 93 parts of vaselinum flavum until uniformly dispersed. An ointment is obtained having good acaricidal properties. By dilution with suitable solvents, the ointment may be given a thinly liquid consistency. Such an ointment may be used for attacking boophilus on cattle by smearing the hair and the skin.

*Example (o)*

A solution of 5 parts of β,β-dimethyl-acrylic acid-N-ethyl-N-β-phenoxy-ethyl-amide, 5 parts of cyclohexanone and 90 parts of difluoro-dichloro-methane may be used as a solution under pressure for an aerosol bomb. When sprayed, there is obtained an aerosol which is particularly suitable for combatting mites in enclosed spaces, such as, for example, grain silos.

What we claim is:
1. An amide having the general formula:

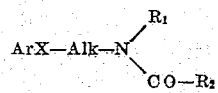

wherein Ar is selected from the group consisting of phenyl, lower alkyl-phenyl, chloro-phenyl and lower alkoxy-phenyl radicals, X is selected from the group consisting of oxygen and sulphur, Alk is a lower alkylene radical containing up to three carbon atoms, $R_1$ is selected from the group consisting of hydrogen, lower alkyl, lower alkenyl and lower aralkyl radicals, and $R_2$ is a lower α,β-unsaturated aliphatic radical.

2. A process for the production of an amide having the general formua

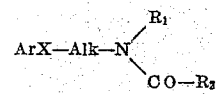

which comprises contacting a compound selected from the group consisting of an amine having the formula

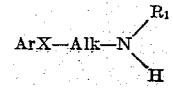

a salt of said amine and a carbamic acid halide of said amine with a compound selected from the group consisting of an acid having the formula $R_2$—COOH, and the corresponding acid halide, wherein Ar is selected from the group consisting of phenyl, lower alkyl-phenyl, chloro-phenyl and lower alkoxy-phenyl radicals, X is selected from the group consisting of oxygen and sulphur, Alk is a lower alkylene radical containing up to three carbon atoms, $R_1$ is selected from the group consisting of hydrogen, lower alkyl, lower alkenyl and lower aralkyl radicals, and $R_2$ is lower α,β-unsaturated aliphatic radical, in liquid phase.

3. β,β-dimethyl-acrylic acid -N-methyl-N-β-phenoxy-ethyl amide having the formula:

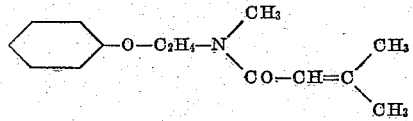

4. Crotonic acid -N-ethyl-N-β-phenoxypropyl-amide having the formula:

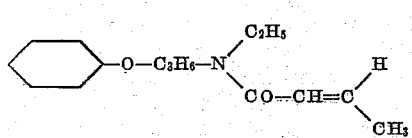

5. β,β-dimethyl-acrylic acid -N-ethyl-N-β-phenoxy-ethyl-amide having the formula:

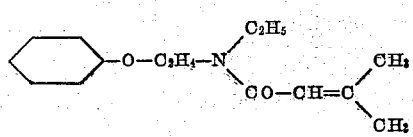

6. Crotonic acid -N - ethyl - N - β - phenoxyethyl-amide having the formula:
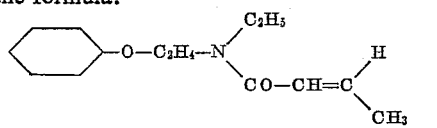
7. β,β-dimethyl-acrylic acid amide of 1-(2',4'-dimethyl-phenoxy)-2-methylamino-propane having the formula
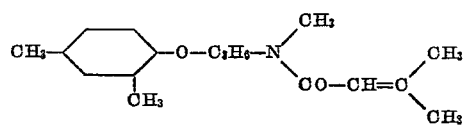
References Cited in the file of this patent
UNITED STATES PATENTS
2,541,930   Martin et al. _____ Feb. 13, 1951
OTHER REFERENCES
Suter et al.: "Liebigs Annalen," vol. 576 (1952), pp. 219, 224–231.